United States Patent [19]

Lu

[11] Patent Number: 4,505,962
[45] Date of Patent: Mar. 19, 1985

[54] MICROWAVABLE PLASTIC CONTAINERS WITH HEAT AND GREASE RESISTANT LAYER COMPRISING IMPACT POLYMER

[75] Inventor: Pang-Chia Lu, Belle Mead, N.J.

[73] Assignee: Mobil Oil Corporation, New York, N.Y.

[21] Appl. No.: 454,772

[22] Filed: Dec. 30, 1982

[51] Int. Cl.³ .............................................. B65D 11/02
[52] U.S. Cl. ...................................... 428/35; 428/213; 428/319.7; 428/319.9; 428/492; 428/515; 428/519; 219/10.55 E
[58] Field of Search ..................... 428/35, 319.7, 319.9, 428/519, 213, 515, 492; 219/10.55 E; 525/316

[56] References Cited

U.S. PATENT DOCUMENTS 4,188,432 2/1980 Holden et al. ........................ 428/35

*Primary Examiner*—George F. Lesmes
*Assistant Examiner*—P. R. Schwartz
*Attorney, Agent, or Firm*—Alexander J. McKillop; Michael G. Gilman; Edward J. Trojnar

[57] ABSTRACT

Multi-layer containers comprising an exterior layer of foamed or unfoamed polystyrene or poly(para-methylstyrene) which is not resistant to hot fat under microwave cooking conditions and an interior layer of 5 mils or less of an impact copolymer of at least 5 weight percent rubber and styrene or para-methylstyrene which serves as a heat and grease resistant layer rendering the container suitable for microwave cooking of fatty foods.

7 Claims, No Drawings

MICROWAVABLE PLASTIC CONTAINERS WITH HEAT AND GREASE RESISTANT LAYER COMPRISING IMPACT POLYMER

BACKGROUND OF THE INVENTION

1. Field of the Invention

This invention relates to containers, adapted for holding food, which are suitable for use in microwave oven cooking.

2. Description of the Prior Art

It is known in the art to produce various shaped articles from foamed and unfoamed thermoplastic materials such as polystyrene sheet by thermoforming methods. Many such articles are containers used for packaging foods.

Many thermoplastic containers, however, are melted by hot fats and cannot be used to package fat-containing foods that are to be heated in a microwave oven. In particular, polystyrene containers are not suitable for microwave cooking. Similarly, containers made from poly(p-methylstyrene) are not resistant to hot fats when heated in a microwave oven.

Microwavable thermoplastic containers are described in copending U.S. Pat. No. 4,335,181 of John P. Marano and Maya S. Farag. The containers disclosed in that patent are made from polymers which are not in themselves microwavable in the presence of hot fats, for example, polystyrene, poly(para-methylstyrene) and polyethylene. Melt-through in the presence of hot fat is avoided by laminating to the substrate a protective film such as polyacrylonitrile or polyethylene terephthalate.

Containers made from poly(para-methylstyrene) which are resistant to hot fats under microwave cooking conditions are described in U.S. Pat. No. 4,205,114 to Peter J. Canterino and Harold A. Arbit. Fat resistance is obtained by cross-linking the poly(para-methylstyrene) with ionizing radiation.

Articles such as plates which are microwavable in contact with fatty foods are commercially available. Some of these are believed to be polystyrene foam with a layer of impact polystyrene on their inner surfaces. The impact layer is relatively thick (5 to 8 mils) and the rubber content of the impact polymer is about 3 percent.

In accordance with this invention, it has been found that significantly less of the relatively expensive impact polymer can be used if the rubber content of the impact polymer is greater than about 5 percent without sacrificing resistance of the article to hot fat under microwave conditions. It has also been found that minimizing orientation of the impact layer is beneficial in obtaining good resistance to hot fat in a microwave oven. Thus, a microwavable article can be made having other desirable characteristics more cheaply than previously thought possible.

BRIEF DESCRIPTION OF THE INVENTION

This invention relates to multi-layer containers which are suitable for use in microwave cooking in the presence of hot fat and the method of producing such containers. The outer layer or the substrate of the container is prepared from a material which is not itself suitable for microwave cooking, for example foamed or unfoamed polystyrene or poly(para-methylstyrene). The inner layer which contacts the food and serves as a protective layer is an impact styrene or impact paramethyl styrene polymer containing at least 5 weight percent rubber. By using such impact polymers the thickness of the impact polymer layer can be reduced to 5 mils or less thus saving on the quantity of the impact polymer needed to achieve the desired fat microwave resistance.

The containers of this invention can be prepared by any method but preferably by coextrusion in the known manner.

DESCRIPTION OF SPECIFIC EMBODIMENTS

The monomers used in preparing the homopolymer or copolymers from which the exterior or substrate of the shaped articles or containers of this invention are made are styrene or p-methylstyrene. It is within the contemplation of this invention to use mixtures of methylstyrene rich in p-methylstyrene. Such mixtures contain at least 90 weight percent, preferably 95–99 weight percent, p-methylstyrene and less than 0.1 weight percent o-methylstyrene, with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287, incorporated herein by reference.

The manner by which foamed sheet, suitable for the substrate or exterior layer, is prepared from the aforedescribed polymers or copolymers is not an essential feature of this invention. The general methods of forming foamed sheet are discussed in U.S. Pat. No. 3,444,283 which is incorporated herein by reference. The preferred method is a direct injection extrusion operation described in U.S. Pat. No. 3,619,445, incorporated herein by reference, which describes the complete direct injection extrusion foam lines. Ser. No. 506,836, referred to in U.S. Pat. No. 3,619,445, is now U.S. Pat. No. 3,444,283. As described in these incorporated patents, nucleating or cell size control agents can be used.

Likewise, the manner by which unfoamed sheet is prepared from the aforedescribed polymers or copolymers is not an essential feature of this invention. Any of the methods well known in the art can be used, such as extrusion through a slot die. The sheet can be oriented or non-oriented.

The impact polymers of styrene are commercially available materials. Impact polymers of para-methylstyrene and their preparation are described in U.S. Pat. No. 4,306,049, which is incorporated herein by reference. Suitable impact polymers are prepared by polymerizing styrene or para-methylstyrene monomer in the presence of a rubber such as polybutadiene with a free-radical catalyst such as benzoyl peroxide under conditions which promote grafting of polystyrene or poly(paramethylstyrene) onto the rubber backbone. The rubber should comprise at least about 5 weight percent of the impact copolymer and generally constitutes 5 to 14 weight percent, preferably 8 to 10 weight percent. Polybutadiene is the preferred rubber but other rubbers and rubbery polymers can be used as the backbone of the impact polymer.

The use of impact polymers results in an advantage in the commercial practice of this invention. One advantage is derived from the relative compatibility of impact polymers and polystyrene of poly(para-methylstyrene) which permits the recycle of scrap constituting two-layer sheet material. Considerable amounts of scrap are generated when containers are manufactured from sheet material as described herein. Since the two layers of the scrap cannot be feasibly separated, it is highly advantageous to be able to mix some of the scrap with virgin polystyrene or poly(para-methylstyrne) for use in the exterior layer. Recycling of scrap is possible only when relatively compatible polymers are used in the several layers. Another advantage is that the interior and exterior layers exhibit excellent adhesion to each other.

The impact polymer layer can be applied to the substrate in a convenient manner. For example, the containers of this invention can be prepared by coextrusion of the described interior and exterior layers into sheet stock which is subsequently thermoformed into the desired container. It is also possible to extrusion coat either layer onto a preformed layer of the other or to laminate two preformed layers with heat and pressure.

It is preferable that the impact copolymer layer not be highly oriented because less oriented films of impact polymer give superior resistance to fats in microwave cooking. Thus, if the impact copolymer layer is separately formed it is preferable that it be formed by casting than by the blown film method, since the latter method generally results in greater orientation. It is also desirable that the degree of orientation in the machine and transverse direction be substantially balanced for best results.

Although specific reference has been made to two layers and exterior layer which can be foamed and an interior impact polymer layer it is not intended to exclude other additional layers. It is only essential that the impact polymer layer form the interior of the container. The outside of the exterior layer can be coated and an adhesive layer or the like can be present to assist in the adhesion of the impact polymer layer to the substrate.

As previously indicated, the interior impact copolymer layer has a thickness of less than 5 mils. Preferably, a thickness of 2 to 4 mils is used.

The processes of thermoforming to produce shaped articles are well known to those skilled in the art. A common method of thermoforming is vacuum forming. The shaped articles produced by thermoforming the foamed or unfoamed sheet laminate can vary widely. Typical shapes that are utilizable include trays, tubs, bowls, cups, and the like. Such shaped articles are adaptable for packaging foods and, particularly, for packaging foods containing fats.

The test procedure used to determine hot fat resistance is to place a piece of uncooked bacon on the test sample and to cook the bacon in a microwave oven for three (3) minutes. Without a protective coating, materials such as foamed polystyrene, will be severely deformed, usually developing a hole in the area in contact with the bacon.

The invention is illustrated by the following non-limiting example.

EXAMPLE

A series of samples were prepared by laminating various thicknesses of cast films prepared from styrene-butadiene impact copolymer containing about 9.5 polybutadiene (Mobile 610D), to a sheet of polystyrene foam. One strip of bacon was placed on each sample and the samples were heated in a microwave oven. The samples were observed at 30 second intervals of cooking until failure occurred. The results are tabulated in the table below.

TABLE

| IMPACT CO-POLYMER THICKNESS | Minutes Survived | | | | | |
| --- | --- | --- | --- | --- | --- | --- |
|  | 3.5 | 3 | 2.5 | 2 | 1.5 | 1 |
| 1.5 Mil | No | No | No | Yes | Yes | Yes |
| 2 Mil | No | No | No | Yes | Yes | Yes |
| 2.5 Mil | No | Yes | Yes | Yes | Yes | Yes |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. A multi-layer container adapted for microwave heating in the presence of hot fat comprising an interior layer, of less than 5 mils in thickness and at least one thermoplastic exterior layer in contact with said interior layer, which exterior layer is not itself resistant to hot fat under microwave cooking conditions; said interior layer, which provides hot fat resistance, consisting of an impact polymer of styrene or para-methylstyrene and at least 5 weight percent rubber and free of polyolefin; said exterior layer comprising a polymer of styrene or para-methylstyrene, wherein said interior layer is substantially unoriented and has a thickness of 2 to 4 mils. and said impact copolymer comprises 5 to 14 weight percent rubber.

2. The multi-layer container of claim 1 in which said exterior layer comprises foamed polystyrene.

3. The multi-layer container of claim 1 in which said exterior layer comprises foamed poly(para-methylstyrene).

4. The multi-layer container of claim 1 in which said interior layer is a impact copolymer of styrene.

5. The multi-layer container of claim 1 in which said interior layer is an impact copolymer of para-methylstyrene.

6. The multi-layer container of claim 1 in which said interior layer is a cast film.

7. The multi-layer container of claim 1 in which said impact copolymer comprises styrene or para-methylstyrene and rubber, said rubber being present in an amount from greater than 8 weight percent, to 10 weight percent of said impact polymer.

* * * * *

UNITED STATES PATENT AND TRADEMARK OFFICE
CERTIFICATE OF CORRECTION

PATENT NO. : 4,505,962
DATED : March 19, 1985
INVENTOR(S) : PANG-CHIA LU

It is certified that error appears in the above-identified patent and that said Letters Patent is hereby corrected as shown below:

Column 4, line 6: "Mobile" should be --Mobil--.

Column 4, line 36: delete "and free of polyolefin".
(Claim 1, line 9)

Signed and Sealed this

Thirtieth Day of July 1985

[SEAL]

Attest:

DONALD J. QUIGG

Attesting Officer    Acting Commissioner of Patents and Trademarks